United States Patent [19]

Martin

[11] Patent Number: 5,888,618
[45] Date of Patent: Mar. 30, 1999

[54] FIRE-RESISTANT, RETROREFLECTIVE STRUCTURE

[75] Inventor: David C. Martin, Berlin, Conn.

[73] Assignee: Reflexite Corporation, Avon, Conn.

[21] Appl. No.: 756,391

[22] Filed: Nov. 26, 1996

Related U.S. Application Data

[63] Continuation-in-part of Ser. No. 119,459, Sep. 10, 1993, Pat. No. 5,648,145.

[51] Int. Cl.[6] .................................. B32B 3/10; B32B 5/30
[52] U.S. Cl. ........................ 428/156; 359/529; 359/530; 428/161; 428/167; 428/412; 428/424.6; 428/483; 428/517; 428/518; 428/520; 428/920; 428/921
[58] Field of Search ..................... 359/529, 530; 428/156, 161, 167, 412, 424.6, 483, 517, 518, 520, 920, 921

[56] References Cited

U.S. PATENT DOCUMENTS

| | | | |
|---|---|---|---|
| 2,380,447 | 7/1945 | Jungersen | 359/547 |
| 3,172,942 | 3/1965 | Berg | 359/518 |
| 3,684,348 | 8/1972 | Rowland | 359/530 |
| 3,689,346 | 9/1972 | Rowland | 156/245 |
| 3,700,305 | 10/1972 | Bingham | 358/540 |
| 3,712,706 | 1/1973 | Stamm | 359/531 |
| 3,758,192 | 9/1973 | Bingham | 359/538 |
| 3,810,804 | 5/1974 | Rowland | 156/245 |
| 3,811,983 | 5/1974 | Rowland | 156/245 |
| 4,244,683 | 1/1981 | Rowland | 425/143 |
| 4,533,592 | 8/1985 | Bingham | 428/213 |
| 4,555,161 | 11/1985 | Rowland | 359/530 |
| 4,576,850 | 3/1986 | Martens | 428/156 |
| 4,637,950 | 1/1987 | Bergeson et al. | 428/168 |
| 4,755,425 | 7/1988 | Huang | 428/331 |
| 4,801,193 | 1/1989 | Martin | 359/518 |
| 5,110,655 | 5/1992 | Engler et al. | 428/143 |
| 5,171,624 | 12/1992 | Walter | 428/156 |
| 5,229,882 | 7/1993 | Rowland | 359/530 |
| 5,264,063 | 11/1993 | Martin | 156/247 |

FOREIGN PATENT DOCUMENTS

| | | |
|---|---|---|
| 0171900 | 2/1986 | European Pat. Off. . |
| 0481634 | 4/1992 | European Pat. Off. . |
| 3119489 | 12/1982 | Germany . |
| WO 95/07179 | 3/1995 | WIPO . |

*Primary Examiner*—D. S. Nakarani
*Attorney, Agent, or Firm*—Hamilton, Brook, Smith & Reynolds, P.C.

[57] ABSTRACT

A fire-resistant retroreflective structure having an array of rigid retroreflective elements and a method for making the structure are disclosed. The retroreflective structure is formed of an array of rigid retroreflective elements having a first side and a second side. A transparent polymeric film is attached to the first side of the array of rigid retroreflective elements. A transparent fire-resistant outerlayer is attached to the transparent polymeric film. A flame-retardant layer is placed proximate to the second side of the array of rigid retroreflective elements. A fire-resistant polymer underlayer is attached to the flame-retardant layer. The five resistant polymer underlayer can be bonded to the transparent polymeric film through the array of rigid retroreflective elements and the flame-retardant layer.

16 Claims, 5 Drawing Sheets

FIRE-RESISTANT, RETROREFLECTIVE STRUCTURE

RELATED APPLICATION

This application is a continuation-in-part of copending U.S. patent application Ser. No. 08/119,459, filed on Sep. 10, 1993, now U.S. Pat. No. 5,548,145, the teachings of which are incorporated herein by reference.

BACKGROUND OF THE INVENTION

Retroreflective materials are employed for various safety purposes. Particularly, these materials are useful at night time when visibility is critical under low light conditions. This is especially important for firemen's coats and protective clothing where visibility is important. However, the conditions that firemen are exposed to are exceedingly harsh, especially in regard to excessive heat and temperature conditions. Many retroreflective materials are made of plastics that soften at temperatures of about 212° F. (100° C.). The softened plastic in such materials begins to flow causing the material to lose its retroreflectivity.

The clothing and any trim on the clothing for firemen must meet standards established by the National Fire Protection Association (NFPA). The NFPA has recently proposed a new and stricter standard, entitled "Standard on Protective Clothing for Structure Fire Fighting No. 531." This proposed standard requires that the outerlayer material of the fire fighting protective coating pass a set of laboratory test conditions which include flame resistance, heat resistance, fluorescence, photometry and seam strength. In the test for heat resistance, test materials are placed in a forced convection oven at a temperature of 500° F. (260° C.) for a period of at least five minutes. During the test, the materials must not melt, separate, or ignite. In the test for flame resistance, the test material is exposed to a direct flame of a bunsen burner for twelve seconds. During this time, the test material must char less than four inches (10 cm) while not dripping or melting during exposure to the flame. Further, once the flame is turned off, the test material must have an afterflame of less than two seconds. A structure that meets these standards with respect to flame retardance, which is defined as the resistance to catching fire when exposed to a direct flame, and heat resistance, which is defined as the resistance to melting, separating, or igniting when exposed to substantial heat, is hereinafter considered a fire-resistant structure.

This proposed standard further requires that the firemen's coats be trimmed with 325 square inches (2097 cm$^2$) of a retroreflective tape which meets the standard. The tape is applied in the form of bands around the sleeves and on the bottom of the coat.

One type of retroreflective material is formed of cube-corner or prism retroreflectors, such reflectors, are described in U.S. Pat. No. 3,712,706, issued to Stamm on Jan. 23, 1973. Generally, the prisms are made by forming a master die on a flat surface of a metal plate or other suitable material. To form the cube corners, three series of parallel equidistance intersecting v-shaped grooves at 60° angles to each other are inscribed in the flat plate. The die is then used to form the desired cube-corner array into a flat plastic surface. When the groove angle is 70 degrees, 31 minutes, 43.6 seconds, the angle formed by the intersection of two cube faces (the dihedral angle) is 90 degrees, and the incident light is retroreflected back to the source.

The efficiency of a retroreflective structure is a measure of the amount of incident light returned within a cone diverging from the axis of retroreflection. Distortion of the prism structure adversely affects the efficiency. Furthermore, cube-corner retroreflective elements have-low angularity, i.e., the elements will only brightly reflect light that impinges on it within a narrow angular range centering approximately on its axis of retroreflection. Low angularity arises from the inherent nature of these elements which are trihedral structures having three mutually perpendicular lateral faces. The elements are arranged so that the light to be retroreflected impinges into the internal space defined by the faces, and retroreflection of the impinging light occurs by total internal reflection of the light from face to face of the element. Impinging light that is inclined substantially away from the axis of retroreflection of the element (which is the trisector of the internal space defined by the faces of the element) strikes the face at an angle less than its critical angle, thereby passing through the face rather than being reflected.

Further details concerning the structures and the operation of cube-corner microprisms can be found in U.S. Pat. No. 3,684,348, issued to Rowland on Aug. 15, 1972, incorporated in its entirety by reference herein. A method for making retroreflective sheeting is also disclosed in U.S. Pat. No. 3,689,346, issued to Rowland on Sep. 5, 1972, also incorporated by reference herein. The method disclosed in U.S. Pat. No. 3,689,346, teaches forming cube-corner microprisms in a cooperatively configured mold. The prisms are bonded to sheeting to form a composite structure in which the cube-corner formations project from one surface of the sheeting.

SUMMARY OF THE INVENTION

A need exists for retroreflective structures that can be heated to a temperature of about 500° F. (260° C.) for more than five minutes while not significantly diminishing its fire-resistant properties.

The present invention relates to a fire-resistant retroreflective structure which includes an array of rigid retroreflective elements having a first side and a second side. A transparent polymeric film is attached to the first side of the array of the rigid retroreflective elements. A transparent fire-resistant polymer outerlayer is attached to the transparent polymeric film. A flame-retardant layer is proximate to the second side of the array of rigid retroreflective elements. A fire-resistant underlayer is attached to the flame-retardant layer. The transparent polymeric film can be bonded to the fire-resistant underlayer through the array of rigid retroreflective elements and the flame-retardant layer.

A method for forming a fire-resistant, retroreflective structure includes the steps of providing a transparent fire-resistant polymer film. A transparent polymeric film is applied to the transparent fire-resistant polymer film. A polymerizable material is polymerized in a suitable mold to form a rigid retroreflective array of rigid elements having a first side and second side. The first side of the rigid retroreflective array is applied to the transparent polymeric layer. A flame-retardant layer is placed proximate to the second side of the rigid retroreflective array. A fire-resistant underlayer is applied to the flame-retardant layer, thereby forming a fire-resistant, retroreflective structure. The transparent polymeric film is bonded to the fire-resistant underlayer through the array of rigid retroreflective elements and the flame-retardant layer.

This invention includes many advantages. One advantage is that traditional colored transparent vinyl plastics can be used as retroreflective substrates while the retroreflective structure can meet the proposed 500° F. (260° C.) exposure requirement without melting, dripping, charring or retaining enough heat energy so as to inflict a serious burn on a fire fighter. The configuration of the retroreflective structure decreases the mass of the vinyl thermoplastic sufficiently to minimize the exposure of the vinyl to heat during the 500° F. (260° C.) test. Another advantage is that the tape retains a significant portion of its retroreflectivity after exposure to a temperature of 425°–450° F. (218°–232° C.). Further, the surface of the structure is resistant to solvents and wetting and can be easily cleaned to remove soot and dirt, while the structure retains its retroreflectivity.

DETAILED DESCRIPTION OF THE INVENTION

The features and other details of the method and apparatus of the invention will now be more particularly described with reference to the accompanying drawings and pointed out in the claims. The same numeral presented in different figures represent the same item. It will be understood that the particular embodiments of the invention are shown by way of illustration and not as limitations of the invention. The principal features of this invention can be employed in various embodiments without departing from the scope of the invention. All parts and percentages are by weight unless otherwise specified.

Figure 1A:
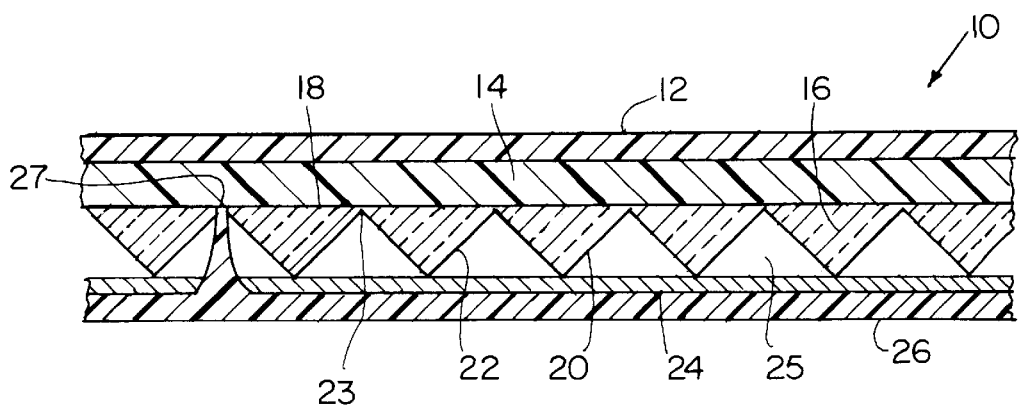
FIG. 1A is a cross-sectional view of a first embodiment of a retroreflective structure of the present invention.

One embodiment of the invention, as shown in FIG. 1A in a cross-sectional view, is retroreflective structure 10. Retroreflective structure 10 is formed of a outerlayer 12 having, inter alia, the following properties comprised in a fire-resistant polymer that does not significantly char, melt or ignite when exposed to a temperature of 500° F. (260° C.) in hot air for at least five minutes. Further, outerlayer 12 does not significantly burn when exposed to a direct flame as required by NFPA Standard 531. Outerlayer 12 provides an abrasion, soil and solvent resistant surface for retroreflective structure 10 which is transparent to visible light while not reducing or interfering with the reflective or optical performance. The outerlayer 12 provides a surface that can be readily cleaned of soot, dirt, solvents, inks, etc. including materials that are considered indelible on cloth. Typically, the outerlayer is readily cleaned by wiping with a tissue, rinsing with water, or washing with a mild soap and water. In addition, outerlayer 12 allows the retroreflective structure to retain essentially all of its retroreflectivity when sprayed with droplets of water or covered with a mist. Furthermore, outerlayer 12 essentially eliminates the migration of fluorescent colorant from retroreflective structure 10 and reduces the frictional and cling qualities that plasticized vinyl possesses.

Outerlayer 12 is composed of a suitable polymer that is crosslinked and carbonizes at a temperature higher than a vinyl plastic. Alternatively, outerlayer 12 can be a copolymer. These polymers include a polyamide, polyester, polyacrylic, polyurethane or other ultraviolet-cured coatings that polymerize and crosslink. The polymer is substantially as flexible as the other layers that are included in the retroreflective structure. In a preferred embodiment, the polymer is a transparent polyurethane film available from Sancor Corp. under the trademark of Sancor™ 815.

Outerlayer 12 can have a thickness in the range of between about 0.0001 and 0.0004 inches (0.00025 and 0.001 cm). In a preferred embodiment, the thickness is in the range of between about 0.0002 and 0.0003 inches (0.0005 and 0.00076 cm). The selected thickness is dependent upon the method of fabrication, the polymer and the fire-resistant characteristics desired for the retroreflective structure.

Outerlayer 12 and transparent film 14 are bonded together. Transparent film 14 can be comprised of a transparent thermoplastic vinyl plastic film, such as polyvinyl chloride, polyvinylidene chloride, urethane. films etc. which are extensible and flexible. Transparent film 14 is transparent to visible light and can be either clear or colored. Suitable colors include fluorescent orange, yellow, etc. In a preferred embodiment, the transparent film is a fluorescent lime-green in color. An example of a suitable transparent film 14 is a polyvinyl chloride film available from Renoliot Corp. under the trademark Renoliot™ H1W series. Outerlayer 12 and transparent film 14 are bonded by many suitable techniques, such as by an adhesive, ultrasonic welding, casting directly onto the outerlayer, etc.

Transparent film 14 can have a thickness in the range of between about 0.003 and 0.02 inches (0.0076 and 0.051 cm). In a preferred embodiment, the thickness is in the range of between about 0.006 and 0.01 inches (0.015 and 0.025 cm). The selected thickness is dependent upon the method of fabrication, the thermoplastic selected and the characteristics desired for the retroreflective structure.

The retroreflective array 16 is an optical element that can consist of retroreflective cube-corner prism elements. Other retroreflective arrays include fresnel lenses and glass beads. The retroreflective array 16 has a first side 18 and second side 20. Retroreflective array 16 can be formed of a transparent polymer that is selected from a wide variety of polymers that are considered rigid or hard. These polymers include the polymers of urethane, acrylic acid esters, hard epoxy acrylates, etc. Other polymers include polycarbonates, polyesters, polynitriles, polyolefins, acrylated silanes and urethane acrylates. The retroreflective array 16 is attached by a suitable deposition process, such as by ultraviolet light, an adhesive, radio frequency welding or election beam. Preferably, the polymer is cast in a mold for forming an array of rigid retroreflective elements with a monomer or oligomer, and polymerization is initiated by ultraviolet-radiation. Transparent film 14 provides a transparent substrate to retroreflective array 16 which provides a smooth surface upon which retroreflective array 16 is attached.

The thickness of retroreflective array 16 at valley 23, where the cube-side edges 22 intersect, is sufficiently thin so that non-extensible prism array 16 can crack and split along valley 23 when a minimal force is applied to retroreflective structure 10. This allows retroreflective structure 10 to significantly flex while allowing the elements of retroreflective array to remain in position with respect to transparent film 14, where retroreflective array 16 is attached, whereby retroreflection is not significantly distorted, thereby significantly maintaining the retroreflective properties of retroreflective structure 10.

The retroreflective cube-corner prism elements can have a length along each cube-side edge 22 in the range of between about 0.003 and 0.006 inches (0.0076 and 0.015 cm). In one embodiment, each cube-side edge 22 has a length of about 0.0049 inches (0.012 cm).

Proximate to the second side of retroreflective array 16 is flame-retardant layer 24 having air space 25 disposed therebetween. Air space 25 is considered the open seal area. Flame-retardant layer 24 is comprised of a suitable material which contains sufficient flame-retardant to reduce the flammability of the retroreflective structure 10. Typically, flame-retardant layer 24 is comprised of a carrying base, such as a rubber-based adhesive. A preferred adhesive is Bostik 4050 available from Bostik Corp. and a flame-retardant composition can include a brominated flame-retardant compound. One such brominated substance is available from Great Lakes Corp. under the trademark Great Lakes DE-83R™. In a preferred embodiment, the flame-retardant layer is comprised of about 60.23% Bostik 4050, 31.32% Great Lakes DE-83R™ and 8.45% kylene. The thickness of flame-retardant layer 24 can be in the range of between about 0.0002 and 0.004 inches (0.0005 and 0.01 cm). In a preferred embodiment, the thickness is in the range of between about 0.002 and 0.0022 inches (0.0051 and 0.0056 cm). The selected thickness is dependent upon the method of fabrication, the flame-retardant selected along with the carrying base, such as the rubber adhesive, and the characteristics required for the retroreflective structure.

Underlayer 26 is comprised of a fire-resistant material. This material can include a polymer, such as a polyamide, or a glass fiber. Other suitable materials include a fiberglass-reinforced vinyl mesh or weave, laminated vinyls or other similar backings. In a preferred embodiment, underlayer 26 is a fire-resistant vinyl, fiberglass reinforced web available from Cooley Corporation, Model No. FT-12-U.

Underlayer 26 can have a thickness in the range of between about 0.003 and 0.005 inches (0.0076 and 0.013 cm). In a preferred embodiment, the thickness is about 0.004 inches (0.01 cm). The selected thickness is dependent upon the method of fabrication, the polymer selected, and the characteristics desired for the retroreflective structure.

Figure 1B:
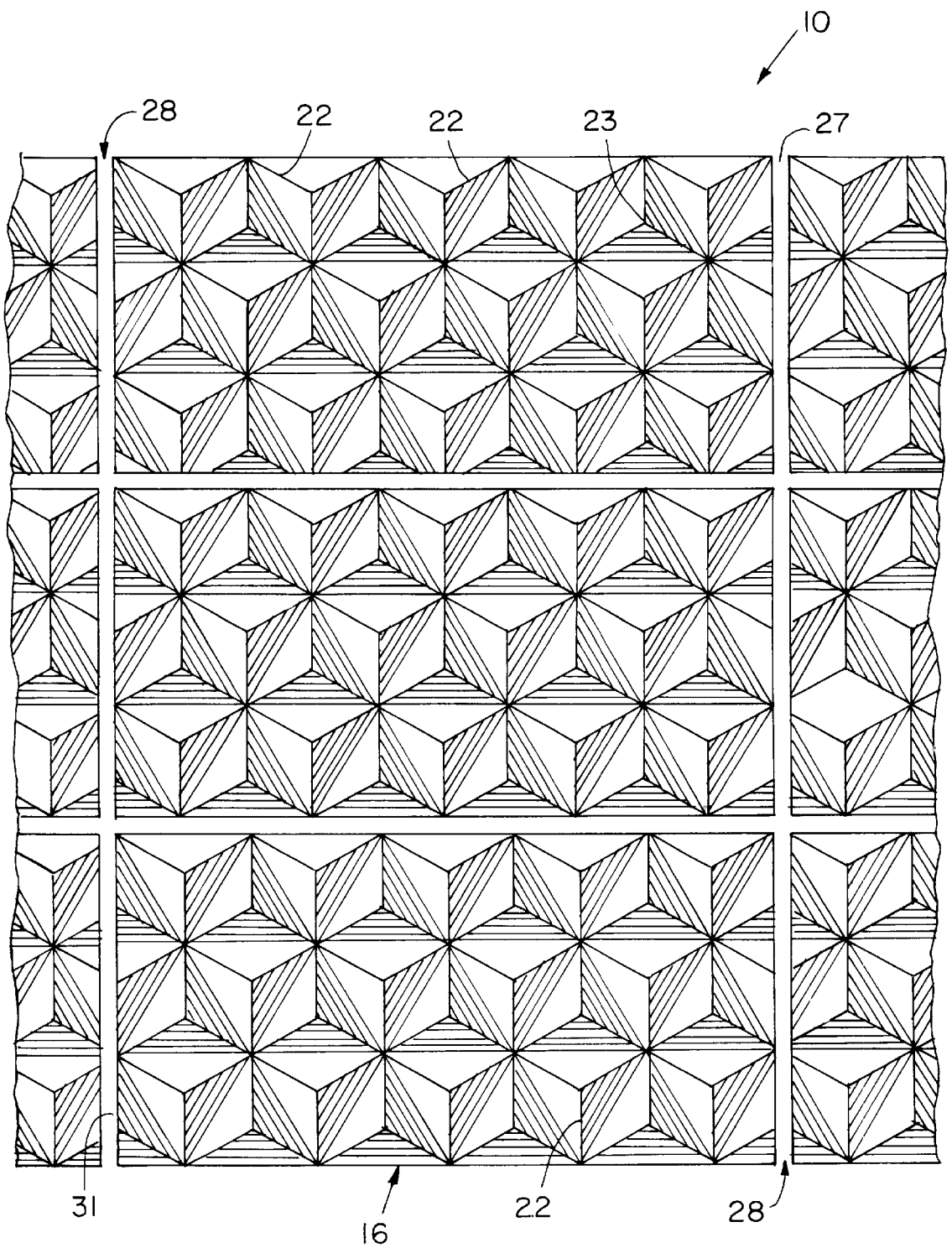
FIG. 1B is a top view of the first embodiment of a retroreflective structure of the present invention.

Underlayer 26 is bonded to transparent film 14 through retroreflective array 16 and flame-retardant layer 24 at point 27. As shown in a top view of retroreflective structure 10 in FIG. 1B, grid pattern 28 can be formed in retroreflective structure 10 by a mold having a mirror image of the grid pattern. While applying pressure to retroreflective structure 10, the structure is exposed to a suitable energy source, such as ultraviolet light, heat or electron beam. The portion of retroreflective structure, which is not bonded between transparent layer 14 and underlayer 26, forms air space 25 between retroreflective array 16 and flame-retardant layer 24. In a preferred embodiment, the lines of the grid are spaced about a half inch (1.25 cm) or inch apart (2.5 cm) and have a width in the range of between about a sixteenth to an eighth of an inch (0.16–0.32 cm). Lines 31 of grid pattern 28 are significantly non-retroreflective as compared to the remainder of retroreflective structure 10.

Figure 2:
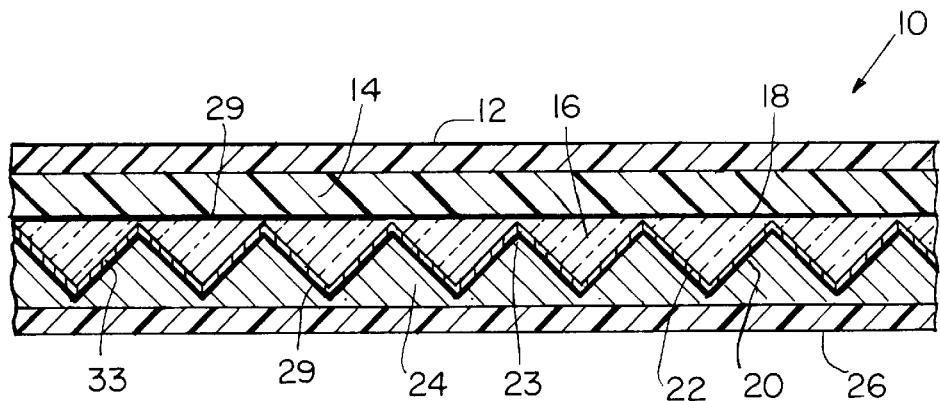
FIG. 2 is a cross-sectional view of a second embodiment of a retroreflective structure of the present invention having a retroreflective coating.

FIG. 2 illustrates another embodiment of the invention. The structure of FIG. 2 has many of the same elements of FIG. 1 and like elements are designated with the like numerals.

Transparent film 14 with retroreflective array 16 can be laminated to transparent film 14 with a transparent adhesive 29. Transparent adhesive 29 provides an adhesive coating that bonds to transparent film 14 and provides crosslinking to anchor retroreflective array 16. The transparent adhesive provides a shield against any plasticizers present in retroreflective structure 10 that would migrate from non-plasticizer resistant oligomers, such as transparent film 14. Plasticizers can have a negative effect on the long-term brightness and stability of retroreflective array 16. Alternatively, 32 retroreflective array 16 can be directly cast onto transparent vinyl film 14 in one step.

If transparent adhesive 29 is employed to attach flame-retardant layer 24 to the retroreflective array second side 20, transparent adhesive 29 can cause the surface of second side 22 of the retroreflective array 16 to wet, thereby destroying the air interface and eliminating the ability of the array to retroreflect. As a result, retroreflective coating 33 is deposited on the surface of second side 20. Typically, the retroreflective coating is formed by sputtering aluminum, copper, silver or gold or by vacuum metallization. Alternatively, metal lacquers, dielectric coatings and other specular coating materials can be employed.

Figure 3:
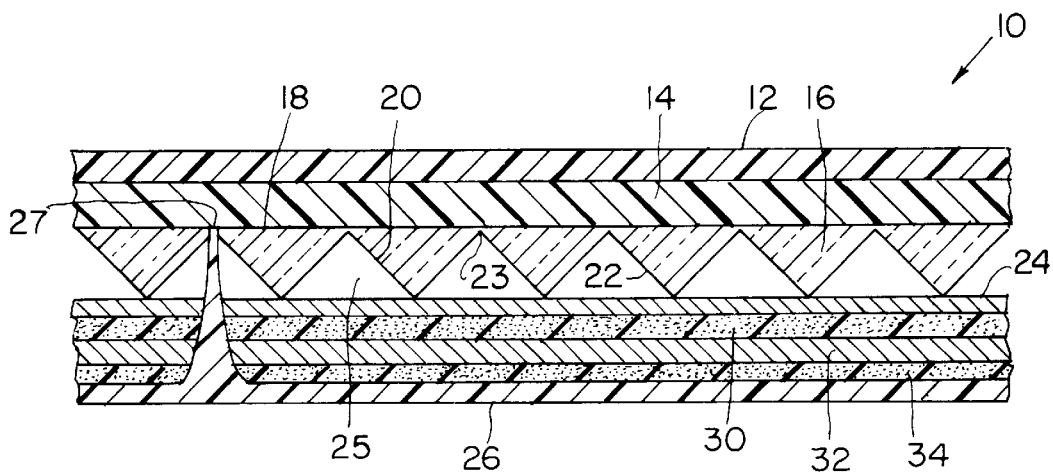
FIG. 3 is a cross-sectional view of a third embodiment of a retroreflective structure of the present invention having a retroreflective coating.

FIG. 3 illustrates another embodiment of the invention. The structure of FIG. 3 has many of the same elements of FIG. 1 and like elements are designated with the like numerals.

Flame-retardant layer 24, as described in FIG. 1, can be a composite of two or more layers. In FIG. 3, the flame-retardant layer is composed of a first layer 30, which is attached to retroreflective array 16, a second layer 32, which is attached to first layer 30, and a third layer 34 which is attached to second layer 32. First layer 30 is comprised of a suitable material which contains sufficient flame-retardant to reduce the flammability of retroreflective structure 10. First layer 30 can include a rubber-based adhesive with a flame-retardant composition as described above as flame-retardant layer 24. The thickness of the first layer 30 is in the range of between about 0.0004 and 0.0006 inches (0.001 and 0.0015 cm). In a preferred embodiment, the thickness is about 0.0007 inches (0.0018 cm). The thickness selected is dependent upon the method of fabrication, the flame-retardant carrying base combination, and the characteristics required for the retroreflective structure.

Second layer 32 is a thermoplastic to provide structural support with a flame-retardant embedded within it. In one embodiment, the thermoplastic is tricresyl phosphate polyvinyl chloride. The thickness of second layer 32 is in the range of between about 0.005 and 0.015 inches (0.013 and 0.038 cm) and with a preferred thickness of about 0.01 inches (0.025 cm).

Third layer 34 is similar to first layer 30 in composition and size. In one embodiment, third layer 30 includes Bostik 4050 rubber-based adhesive with a brominated flame-retardant with a thickness of about 0.0007 inches (0.0018 cm).

The retroreflective structure can be attached to a suitable article of clothing, such as a fireman's overcoat or other structure, such as a fire helmet or air tank, by means known in the art. For instance, a retroreflective structure can be attached by an adhesive that is plasticizer resistant and that is heat activated or pressure sensitive. Alternatively, it can be sewed onto clothing.

Figure 4A:
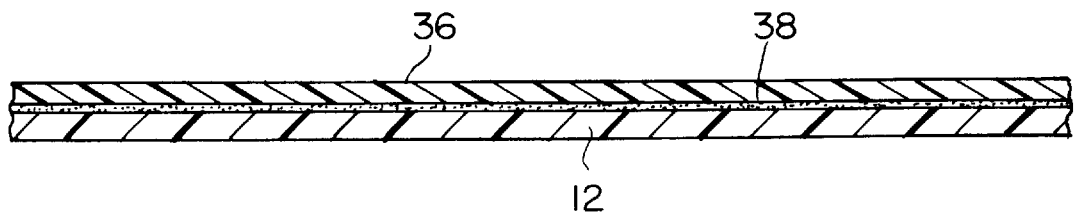
FIGS. 4A, 4B, 4C, 4D, 4E, 4F and 4G are cross-sectional views of a method for forming a retroreflective structure at various points in forming an embodiment of the present invention.
Figure 4B:
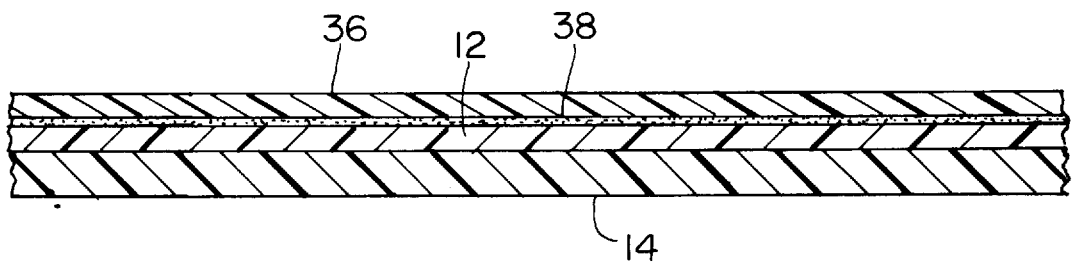

In FIGS. 4A, 4B, 4C, 4D, 4E, 4F and 4G, a method for forming an embodiment of fire-resistant retroreflective structure 10 is shown at various points in the process of forming the structure. In FIG. 4A, carrier film 36 is attached to outerlayer 12 to provide stability to outerlayer 12 during the formation of retroreflective structure. The carrier film can be formed of polyester, polyamide or any other polymer that is significantly non-extensible and is applied to the other side of outerlayer 12 by a suitable carrier film adhesive 38, such as Q2-7406 available from Dow Chemical Co. The carrier film 36 and the carrier film adhesive 38 are removable from the outerlayer by suitable means upon formation of retroreflective structure 10. Carrier film 36 helps to prevent stretching during the coating and minimizes orientation sensitivity of retroreflective structure 10 when cast and stripped from the mold. The carrier film adhesive can be a temporary adhesive that is thermally stable to degradation when exposed to the temperatures encountered while forming the retroreflective structure. In one embodiment, the carrier film adhesive has a strength in the range of about 180 to 220 grams when subjected to a 180° peeling test. In FIG. 4B, the method includes applying transparent film 14 to outerlayer 12 by bonding with an adhesive, ultrasonic welding or by directly casting onto the outerlayer.

Figure 4C:
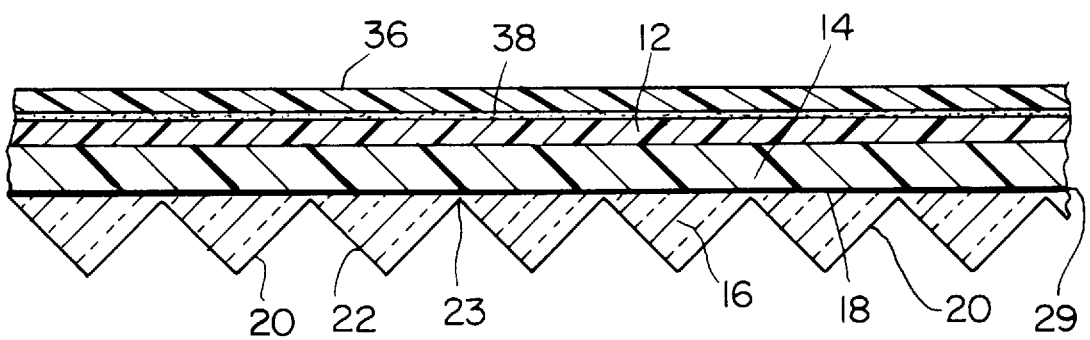

In FIG. 4C, retroreflective array 16 is formed by casting onto transparent film 14. The retroreflective array has first side 18 and second side 20. Retroreflective array 16 is formed of a polymer, such as polyacrylic. The retroreflective array is essentially of the same shape and dimensions as described in FIG. 1. Alternatively, first side 18 of retroreflective array 16 is applied to transparent film 14 by a suitable deposition method. Transparent adhesive 29, such as Bostik 7650, can be applied between transparent film 14 and retroreflective array 16.

Figure 4D:
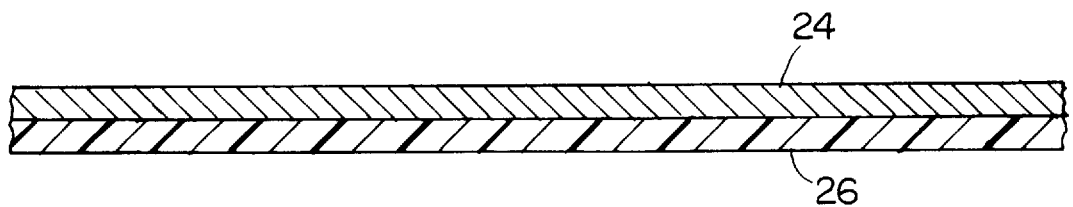

In FIG. 4D, flame-retardant layer 24 is applied to underlayer 26 to form underlayer structure. Flame-retardant layer 24 is allowed to cure if it is rubber-based adhesive flame-retardant layer, as described above. Fire-resistant polymer underlayer 26, such as Cooley FT-12-U, can be heat sealed at 230° F. (110° C.) to the flame-retardant layer.

Figure 4E:
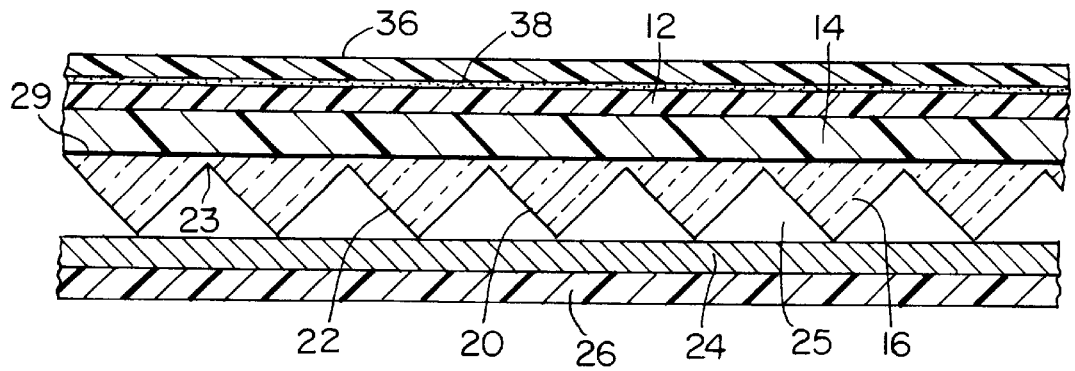
Figure 4F:
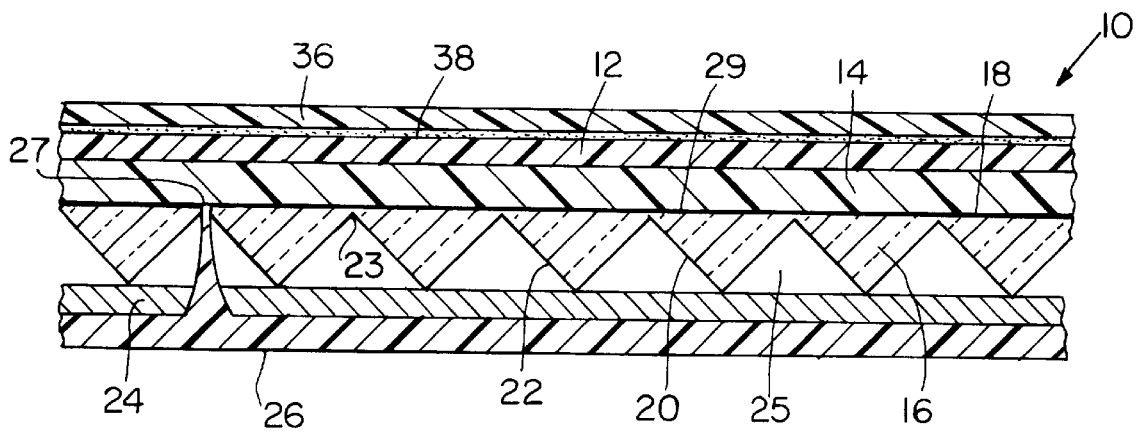
Figure 4G:
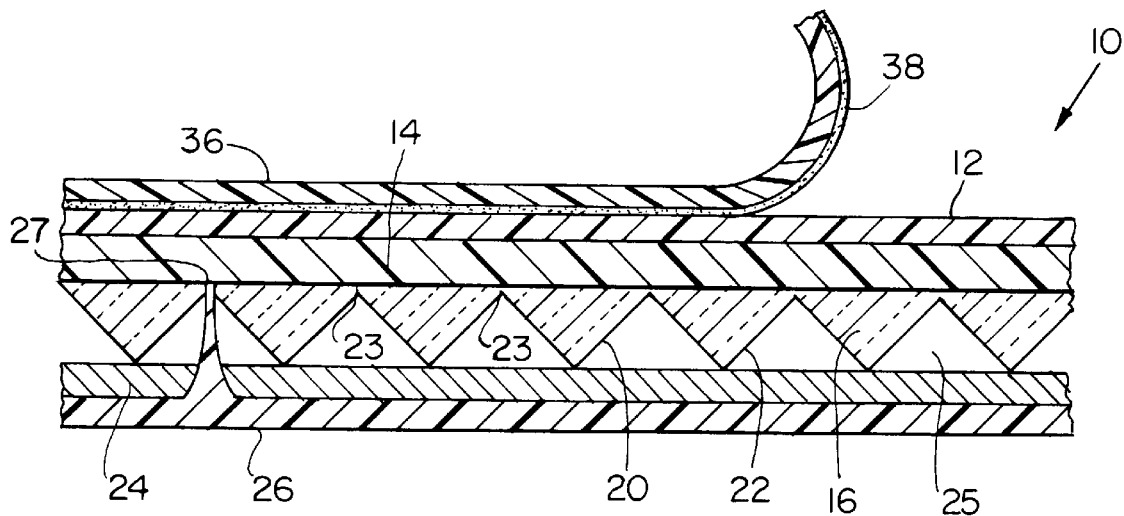

In FIG. 4E, flame-retardant layer 24 is placed adjacent to retroreflective array 16. Air space 25 is formed between retroreflective array 16 and flame-retardant layer 24 where transparent layer 14 is not bonded to underlayer 26. In FIG. 4F, transparent layer 14 and underlayer 26 are bonded at points 27 by placing in a mold having a grid pattern by applying pressure and exposing points 27 to heat, ultraviolet light, etc. to form the bond. Air space 25 is formed between retroreflective array 16 and flame-retardant layer 24 where transparent layer 14 is not bonded to underlayer 26. In FIG. 4G, carrier film 36 and carrier film adhesive 38 may be removed from retroreflective array by peeling or other suitable method, thereby forming a fire-resistant retroreflective structure 10.

Figure 5:
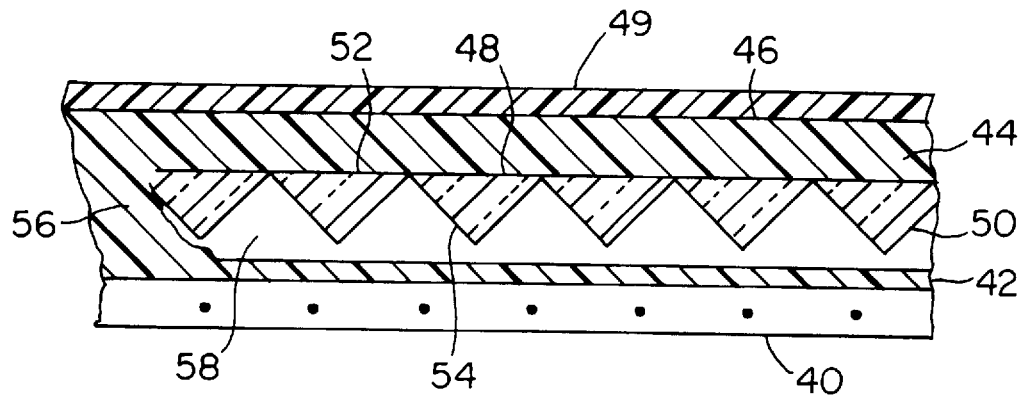
FIG. 5 is a cross-sectional view of a fourth embodiment of a retroreflective structure of the present invention.

FIG. 5 illustrates another embodiment of the invention. Fabric layer 40 is a fire-resistant material. This material includes a cotton fabric with a flame retardant incorporated into the fabric to impart flame retardance to the fabric. Further, other suitable materials include a fiberglass-reinforced vinyl mesh or weave, laminated vinyl, or other similar backings. Fabric layer 40 can have a weight in the range of between about five and six ounces/square yard. The selected weight is dependent upon the method of fabrication, the polymer selected and the characteristics desired for the retroreflective structure. In one embodiment, fabric layer 40 is made by Westex, Inc., Chicago, Ill. The fabric is style 66 100% carded cotton with Proban®/FR-7A® treatment. Typical afterflame is two seconds, afterglow is two seconds and char length maximum is five inches (Federal Test Method 191 and Standard Method 5903).

Fabric layer 40 is laminated to vinyl layer 42 which includes a suitable plastic film that has a flame retardant incorporated therein. In one embodiment, the flame retardant includes 19.1% bromine, 3.7% antimony and 0.5% phosphorus, by weight of the combined weight of the plastic film and flame retardant. Examples of a suitable plastic film include polyvinyl chloride and polyvinylidene chloride. A preferred example is a polyvinyl film available from Cooley Inc., Pawtucket, R.I.

Fabric layer 40 can have a thickness of between about 0.01 and 0.013 inches and vinyl layer 42 can have a thickness of about 0.008 inches or greater. After laminating the layers together, the total thickness can be in the range of between about 0.015 and 0.018 inches.

Top film 44 has first side 46 and second side 48 and includes a clear plastic material that allows transmission of light through the film. Top film 44 can have a thickness in the range of between about 0.0005 and 0.02 inches. Examples of polymers preferably employed for top film 44 include polyvinyl halides, polyethylene terephthalate, polyvinylidene chloride, polycarbonates, polysulfones and cellulose ester polymers.

On first side 46 of top film 44, coating 49 is attached. Coating 49 is a flame retardant, such as brominated flame retardant. An example of a suitable flame retardant is Great Lakes DE-83R™ flame retardant.

Retroreflective array 50 is similar to the arrays described above. Retroreflective array 50 has first side 52 and second side 54. Retroreflective array 50 is formed by a suitable method known in the art, as described above, and is attached on first side 52 to second side 48 of top film 44. Second side 54 of retroreflective array 50 is exposed to air.

Fabric layer 40 and vinyl layer 42 is bonded to top film 44 through retroreflective array 50 at point 56 and forms air space 58 between retroreflective array 50 and vinyl layer 42. As discussed above for the embodiment in FIGS. 1A and 1B, the retroreflective structure can be formed by exposure to a suitable energy source in a mold.

Figure 6:
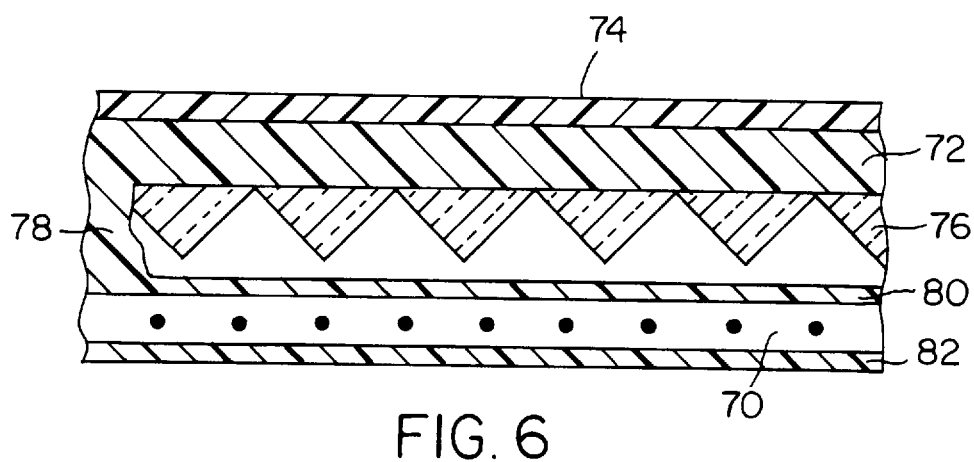
FIG. 6 is a cross-sectional view of a fifth embodiment of a retroreflective structure of the present invention.

FIG. 6 illustrates another embodiment of the invention which includes fabric layer 70 which is a flame retardant backing having cotton or polyester mesh. The mesh is impregnated with a plastisol, which is a dispersion of finely divided resin in a plasticizer. A typical composition is 100 parts resin and 50 parts plasticizer, forming a paste that gels when heated to about 150° C. as a result of solvation of the resin particles by the plasticizer. Vinyl plastic films 80,82 similar type plastic films having a brominated fire retardant dispersed throughout the plastic film are laminated on each side of the mesh to form a single fabric layer.

Also in the embodiment of the invention illustrated, top film 72 which is formed of a polyvinyl chloride or other transparent plastic. Top film 72 has flame retardant coating 74, such as a brominated flame retardant, on one side and retroreflective array 76. Top film 72 and fabric layer 70 with vinyl plastic films 80,82 are bonded together at point 78 and forming air space 79 between retroreflective array 76 and fabric layer 70.

The embodiments shown in FIGS. 5 and 6 can meet the NFPA 1971 requirements for after flame (less than or equal to two seconds) and char length (less than or equal to four inches or 101.6 mm). The test results for the embodiments in FIGS. 5 and 6 are similar to the results in Table 1.

EXAMPLE 1

Fire-resistant retroreflective structure 10 was formed of a hard polyurethane outerlayer having a thickness of 0.003 inches (0.0076 cm) and was made of Sancor™ 815. A transparent film layer was attached to the outerlayer. The film was made of transparent polyvinyl chloride film having a lime green color. The film was Renoliot™ H1W having a thickness of 0.006 inches (0.015 cm).

The retroreflective array with a first side and a second side was composed of a transparent ultraviolet cured polyurethane. The prisms had a side length of 0.0049 inches (0.012 cm). A flame-retardant layer was placed proximate to the second side of the retroreflective array.

The flame-retardant layer was comprised of 60.23% rubber-based adhesive Bostik 4050, 31.32% a brominated flame-retardant, Great Lakes DE-83R™, and 8.45% xylene. The flame-retardant layer, which was adjacent to the second side of retroreflective array, had a thickness of 0.0022 inches (0.0056 cm). The underlayer was comprised of a fiberglass reinforced vinyl film, Cooley FT-12-U, and had a thickness of 0.01 inches (0.025 cm).

Samples of the fire-resistant retroreflective structure, two by twelve inches (5.1 by 30.5 cm) in size, were tested for flame retardation and retention of retroreflectivity in specific intensity per unit area at 0° and 90° orientations. The lime colored samples were tested under the methods provided in proposed NFPA Standard on Protective Clothing for Structure Fire Fighting No. 531. The samples were tested for retroreflectivity after exposure in a force convection oven for five minutes to various temperatures in the range of between 325° and 500° F. (163° and 260° C.). After each test, the following were tested: color, strength of the tape maintained in resisting elongation as a percentage of a control sample not exposed to the heating, drip and surface tackiness. The results are disclosed in Table 1.

TABLE 1

| Temperature | | Specific Intensity | | Strength |
|---|---|---|---|---|
| °F. | °C. | per Area* | Color | % |
| 325 | 163 | 473 × 440 | No change | 100 |
| 350 | 177 | 423 × 388 | Slight Tint | 100 |
| 375 | 191 | 260 × 220 | More Tint | 100 |
| 400 | 204 | 82 × 88 | Brown Tint | 100 |
| 425 | 218 | 63 × 62 | Dark Brown Tint | 100 |
| 450 | 232 | 52 × 54 | Orange Tint | 100 |
| 475 | 246 | 7 × 10 | Dark Maroon | 90 |
| 500 | 260 | 1 × 3 | Red/Black | 80 |

*Specific intensity per unit area in candela/lux/m² measured at 0° and 90°, respectively.

No dripping or surface tackiness was detected. An afterflame burn test measured 1.4 to 1.8 seconds. A burn through of 1.5 inches (3.81 cm) was measured. There was no afterglow detected. The char length was 0.375 inches (0.95 cm).

EXAMPLE 2

Samples of the fire-resistant retroreflective structure, two by twelve inches (5.1 by 30.5 cm) in size, were also tested under British Flame Test Standards prEN 532 (1993) for flammability using a flame application time of ten seconds. The results were assessed against the requirements of Paragraph 6.1 for flame spread under prEN 469 "Protective Clothing for Fire Fighters" (June 1992 version). Five specimens, two by twelve inches (5.1 by 30.5 cm), were tested. The retroreflective samples were washed for five cycles of ISO 6330 at 60° C. followed by tumble drying prior to testing. The samples were tested for fluorescence black light activation after exposure in a forced convection oven for five minutes at various temperatures in the range of between 325 and 500° F. (163° and 260° C.). The results are disclosed in Tables 2 and 3.

TABLE 2

FLUORESCENCE
(after five minutes at °F.)

| Temperature °F. | °C. | Black Light Activation |
|---|---|---|
| 325 | 163 | unaffected open seal area |
| 350 | 177 | unaffected open seal area |
| 375 | 191 | unaffected open seal area |
| 400 | 204 | unaffected open seal area |
| 425 | 218 | high level open seal area |
| 450 | 232 | reduced level open seal area |
| 475 | 246 | detectable with black light |
| 500 | 260 | undetectable with black light |

TABLE 3

| | SPECIMEN | | | | |
|---|---|---|---|---|---|
| TEST | 1 | 2 | 3 | 4 | 5 |
| Flaming to Edge | none | none | none | none | none |
| Hole Formation | none | none | none | none | none |
| Flaming or Molten Debris | none | none | none | none | none |
| Afterglow Spreads | none | none | none | none | none |
| Afterflame time, seconds | 1.0 | 0 | 0 | 0 | 0 |
| Afterglow, seconds | 0 | 0 | 0 | 0 | 0 |

No flaming to edge, hole formation by the flame, flaming or molten debris, or afterglow spread was detected. An afterflame burn test measured an average of 0.5 seconds. There was no afterglow measured.

The samples met the British standard that requires that no specimen have flaming at the top or side edges, have hole formation, or flaming or molten debris. The mean value of the afterflame test is to be less than or equal to two second, and the mean value of afterglow shall be less than or equal to two seconds. All the tested samples met the British standard.

EQUIVALENTS

Those skilled in the art will recognize, or be able to ascertain using no more than routine experimentation, many equivalents to specific embodiments of the invention described specifically herein. Such equivalents are intended to be encompassed in the scope of the claims.

I claim:

1. A fire-resistant, retroreflective structure, comprising:
   a) an array of retroreflective transparent polymeric prism elements having a light incident side and a light reflective side;
   b) a transparent polymeric film attached to the light incident side of the array of retroreflective elements;
   c) a transparent flame-retardant layer attached to the transparent polymeric film;
   d) a fabric layer, which is attached to the light reflective side of the array of retroreflective elements; and
   e) a second polymeric film having a flame retardant incorporated therein, said second polymeric film being attached to the fabric layer.

2. The retroreflective structure of claim 1 wherein the transparent polymeric film is bonded to the fabric layer through the array of retroreflective elements and the second polymeric film.

3. The retroreflective structure of claim 1 wherein the transparent polymeric film is a polyvinyl film.

4. The retroreflective structure of claim 3 wherein the polyvinyl film is polyvinyl chloride.

5. The retroreflective structure of claim 4 wherein the polyvinyl chloride contains a colorant.

6. The retroreflective structure of claim 5 wherein the colorant is lime green in color.

7. The retroreflective structure of claim 1 wherein the array of retroreflective elements is formed of material selected from a group consisting of epoxy polyacrylates, polyurethanes polynitriles, polycarbonates, polyesters and polyolefins.

8. The retroreflective structure of claim 1 wherein wherein the transparent flame-retardant layer includes a brominated flame-retardant.

9. The retroreflective structure of claim 1 wherein the transparent flame-retardant layer includes a mixture of a brominated flame-retardant and an adhesive.

10. The retroreflective structure of claim 1 wherein the fabric layer includes a polyamide.

11. The retroreflective structure of claim 1 wherein the fabric layer includes a polyester.

12. The retroreflective structure of claim 1 wherein the fabric layer is a fiberglass reinforced polyvinyl chloride.

13. The retroreflective structure of claim 1 wherein a metallized reflective layer is formed of a metal selected from a group consisting of aluminum, copper, silver and gold, which is deposited on the light reflective side of the rigid retroreflective array.

14. The retroreflective structure of claim 13 wherein the metallized reflective layer is bonded to the fabric layer by an adhesive.

15. The retroreflective structure of claim 1 wherein the transparent polymeric film and the array of retroreflective elements are attached by an adhesive.

16. A fire-resistant, retroreflective structure, comprising:
   a) an array of retroreflective transparent polymeric prism elements having a light incident side and a light reflective side;
   b) a transparent polymeric film attached to the light incident side of the array of retroreflective elements;
   c) a transparent flame-retardant layer attached to the transparent polymeric film;
   d) a fabric layer having a first side and second side, said fabric layer being attached to the light reflective side of the array of retroreflective elements;
   e) a first plastic film having a fire retardant incorporated therein and said first plastic film being attached to the first side of the fabric layer; and
   f) a second plastic film having a fire retardant incorporated therein and said second plastic film being attached to the second side of the fabric layer.

* * * * *